United States Patent [19]

Weeks

[11] 4,381,118
[45] Apr. 26, 1983

[54] MULTI-HITCH APPARATUS FOR TANDEM TOWING OF FARM IMPLEMENTS

[76] Inventor: Harry D. Weeks, 7225 Kile Rd., Plain City, Ohio 43064

[21] Appl. No.: 227,983

[22] Filed: Jan. 23, 1981

[51] Int. Cl.³ .............................................. B60D 1/000
[52] U.S. Cl. .................................... 280/412; 172/311; 280/472
[58] Field of Search ............... 280/411 C, 411 R, 412, 280/413, 410, 456 R, 456 A, 459, 462, 467, 446.1, 472, 479, 480, 499; 56/6, 13.5, 13.6; 172/314, 248, 311, 679, 625

[56] References Cited

U.S. PATENT DOCUMENTS

| | | | |
|---|---|---|---|
| 1,044,744 | 11/1912 | Caswell et al. | 280/459 X |
| 1,728,098 | 9/1929 | Bork | 280/456 R X |
| 2,226,556 | 12/1940 | Even et al. | 280/467 |
| 2,826,430 | 3/1958 | Nelson | 280/456 A |
| 2,963,303 | 12/1960 | Young et al. | 280/462 |
| 3,068,630 | 12/1962 | Caldwell | 280/411 C X |
| 3,112,124 | 11/1963 | Bartel | 280/412 |
| 3,162,459 | 12/1964 | Marmorine et al. | 280/411 C X |
| 3,469,636 | 9/1969 | Kurz | 172/314 |
| 3,635,494 | 1/1972 | Barkstrom et al. | 280/462 |
| 3,738,682 | 6/1973 | Ritter | 280/413 |
| 4,115,984 | 9/1978 | Simpson | 280/411 C |
| 4,178,010 | 12/1979 | Gerber | 280/412 |
| 4,213,628 | 7/1980 | Hardesty | 280/412 |

FOREIGN PATENT DOCUMENTS

725588  4/1980  U.S.S.R. .............................. 280/412

Primary Examiner—Joseph F. Peters, Jr.
Assistant Examiner—Mitchell J. Hill
Attorney, Agent, or Firm—Francis T. Kremblas, Jr.

[57] ABSTRACT

Apparatus for connecting a plurality of towed portable farm implement in optional dual configurations characterized by a first position wherein the farm implements are towed in a staggered or offset relationship to one another for field use and a second position wherein the farm implements are towed in aligned relationship behind the towing vehicle for over the road transportation. The apparatus includes a first tongue portion adapted to be pivotally mounted on the first farm implement between said first and second positions and locking means for releasably fixing the tongue in each of said positions. Additionally, a second hitch means is provided on a pivoted tow bar which is pivotally mounted to a swinging frame portion mounted on said first farm implement between an offset position and an aligned position. Releasably latching members are provided to fix said frame and said arm in the desired position. The arrangement of said first tongue portion and said swinging frame and pivoted tow bar carrying the hitching members cooperate with one another to assure that the hitched connection of said first tongue means is aligned equi-distant between the outermost opposing wheels of the farm implements being towed in either of the towed configurations to equalize the pulling force applied to the trailing towed vehicle.

6 Claims, 10 Drawing Figures

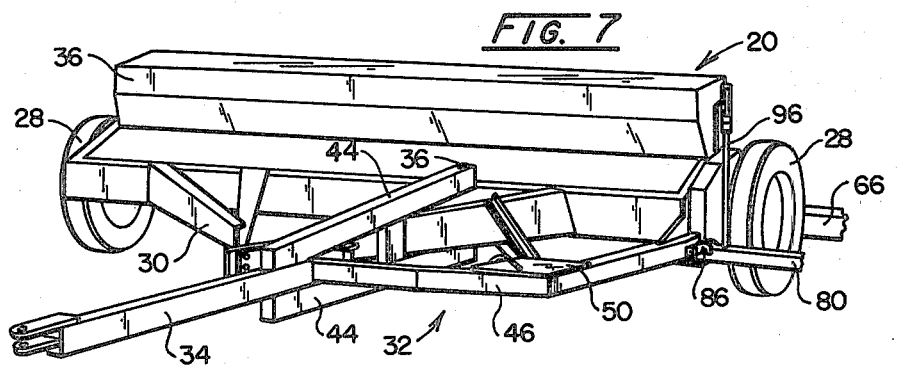
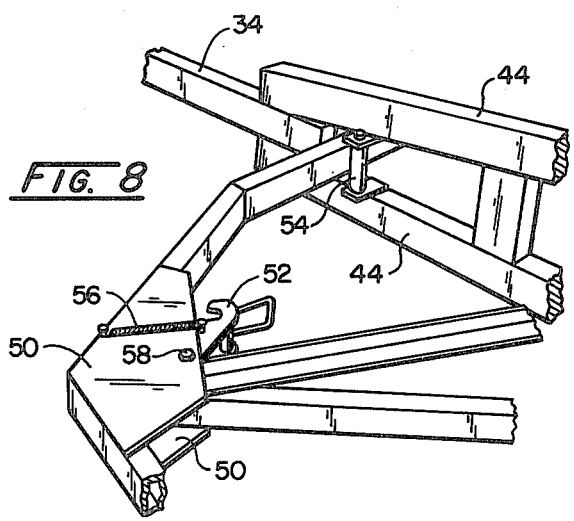
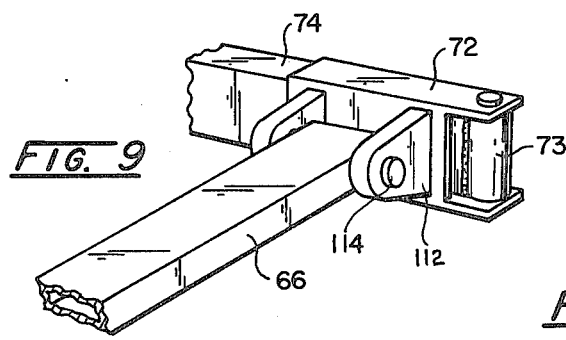
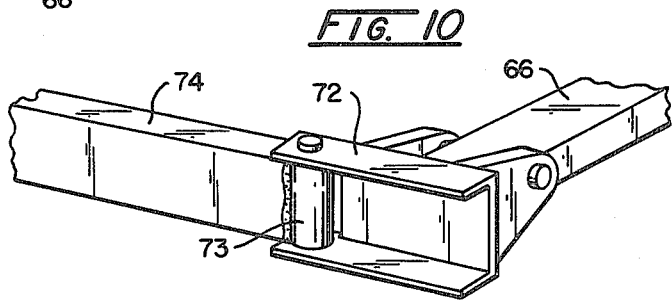

MULTI-HITCH APPARATUS FOR TANDEM TOWING OF FARM IMPLEMENTS

BACKGROUND

It has long been recognized that it is desirable to be able to draw or tow a plurality of farm implements, such as grain drills or the like, in an offset relationship to one another behind a single towing tractor. In this manner the user covers a wider area in a single path to save time and fuel. However, it has also been recognized that one must also be able to transport said farm implements over the road to other fields and the width of any such arrangement must be sufficiently narrow to accommodate road travel.

Many apparatus have been devised to attempt to solve this problem and to do so with means which permit maintaining the proper relationship between the towed farm implements in the offset configuration when the towing vehicle is making the many turns required during typical field use.

These prior art attempts have been partially successful, however, they have not been satisfactory in arriving at a solution wherein the towed implements are maintained in the proper offset field configuration and also are quickly and easily switched to a vertically aligned relationship or other more narrow configuration for transport over roads and highways without a significant loss of both time and effort by the user. It should be noted that time is of the utmost importance during the critical planting and harvesting season and can make the difference between financial success or failure for a farmer, particularly with the limitations weather may place on the ability to work a given field during such critical seasons.

A typical representation of the prior art is represented by the following patents:

| | |
|---|---|
| 1,044,744 | 3,469,636 |
| 3,162,459 | 4,115,984 |
| 3,635,494 | 2,826,430 |
| 2,963,303 | 3,068,630 |
| 2,226,556 | 1,728,098 |

However, none of these prior art devices solve the problem noted herein in a manner such as taught by the present invention wherein a minimum of effort is required by the user to accomplish the transition between the field configuration and the road transport configuration in merely a matter of less than a minute or so.

SUMMARY OF INVENTION

The present invention relates generally to apparatus adapted to connect a plurality of towable farm implements in a predetermined dual configuration behind a towing vehicle. The first configuration represents the desired offset relationship wherein the farm implements follow parallel courses from one another to cover a swath of ground equal to their combined width. The second configuration is defined by the farm implements being retained in a single file relationship behind the towing vehicle to offer the most narrow width for over the road transport to other locations.

The arrangement of the present invention relates particularly to the novel tongue construction wherein the first farm implement is provided with a towing tongue pivotally mounted between at least two releasably locked positions which coincide with the centerline defined by the distance between the opposing outer wheels of the farm implements being towed in either the offset or the single file configuration to eliminate or substantially reduce any side draft forces.

This unique construction also includes a cooperating swinging towing bar and foldable linkage arrangement mounted on the side and rear of the first farm implement, and any additional trailing implements, which are designed to be releasably fixed to draw the trailing vehicle connected to a stub tongue in either offset or single file relationship depending upon releasably locking the swinging arm portion in either a first or second position.

A simple biased latch mechanism is employed to releasably engage the forward towing tongue and the swinging tow bar carrying the hitch for connection to the trailing farm implement in the desired position.

A frame portion is provided on the trailing farm implement to adapt a standard farm implement towing tongue to a single front wheel and hitch connection to permit it to be easily pulled in either of the desired configurations described above.

The pivoted forward tongue and the swinging tow bar and associated foldable linkage are designed to permit arranging the towed implements in either of the desired configurations merely by releasing the locking means and simply backing turning the towing vehicle through a couple of simple manuevers which automatically cause the forward tongue and swing arm to adopt the desired configuration. The latch mechanisms are located such that these maneuvers cause the moving portions to engage the desired latch without the driver leaving the towing vehicle.

The latch may be spring biased to automatically latch the mechanism in position. Manual or mechanical release can be achieved to permit the mechanism to return to the second position where it automatically locks in place.

OBJECTS

It is a primary object to provide a unique multiple hitching connection for farm implements which permits a plurality of farm implements to be towed in a first offset configuration for field use and a second single file configuration for road transport in a simple and convenient manner.

It is another object to provide a multiple hitching arrangement of the type described wherein a standard farm implement such as a grain drill, may be easily adapted to incorporate a forward multiple position towing tongue and a swinging tow bar mounted on a foldable linkage which cooperate to permit a trailing implement to be connected and drawn in the two desired configurations without requiring significant time or effort to change from one configuration to the other.

It is another object of the present invention to provide a multiple hitching and towing arrangement which permits the user to align the drawn implements in the desired towed configuration by simply maneuvering the towing vehicle and which provide for securely maintaining the desired towing configuration in either of two configurations.

It is still a further object of the present invention to provide a multiple hitching and towing arrangement of the type described wherein the construction includes means which assures that the towed farm implements are aligned in the offset configuration for optimum field use with the forward tongue aligned to assure an equal forward pulling force on each of the towed implements. This also permits the operator to back up the tractor and implements whenever desired to manuever the combination for any purpose.

IN THE DRAWINGS

FIG. 7 is a partial perspective view of the apparatus of FIG. 1 illustrating the construction of the forward tongue portion;

FIG. 8 is a partial perspective view of that forward tongue portion shown in FIG. 7; and FIGS. 9 and 10 are partial perspective views of a portion of the apparatus shown in FIG. 1, illustrating the pivotal mounting of the swinging tow bar which is connected to the second towed implement as seen in FIG. 1.

DETAILED DESCRIPTION

Figure 1:
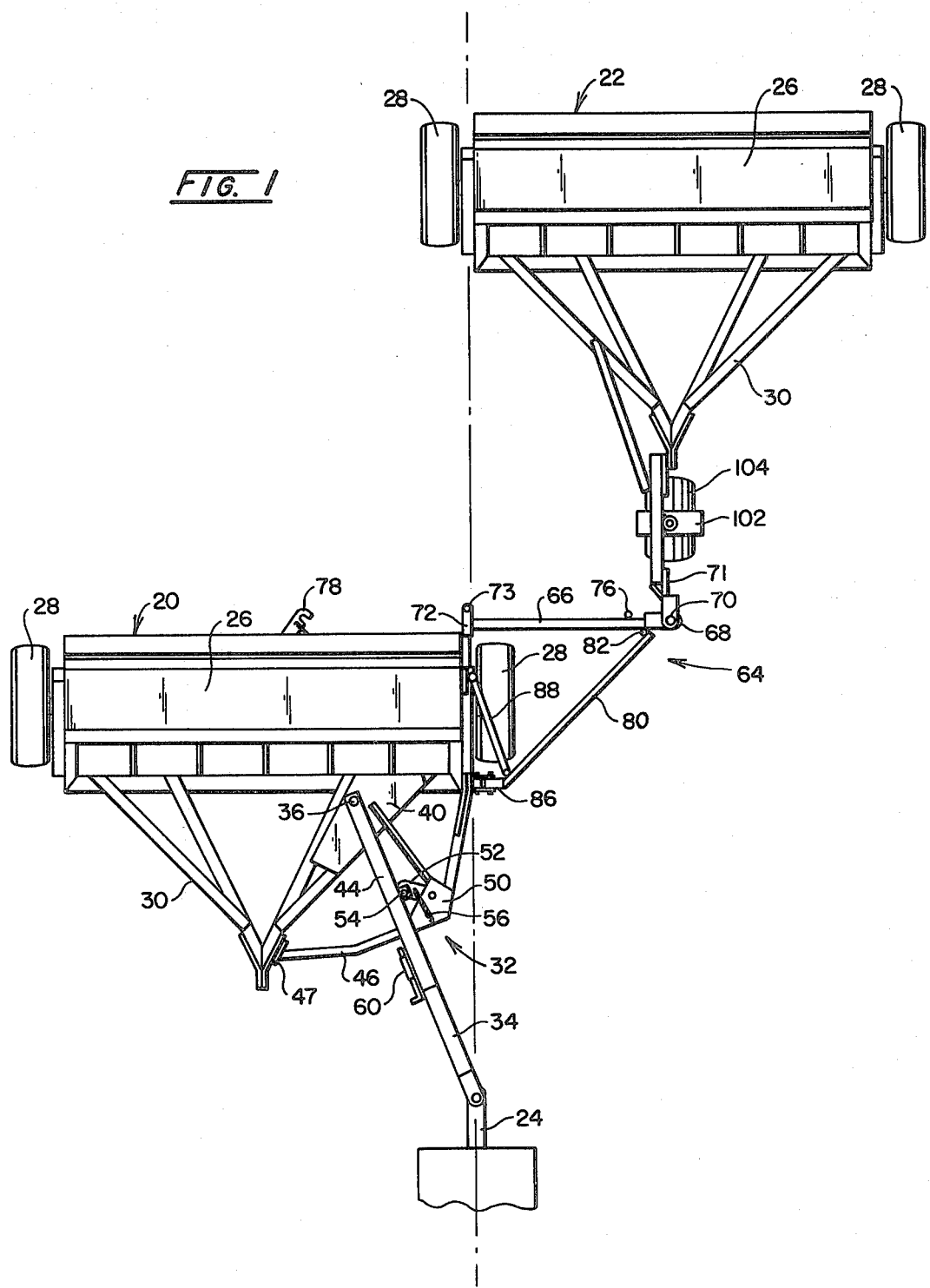
FIG. 1 is a top plan view of a plurality of farm implements provided with a multiple hitching and towing construction for connection to a single towing vehicle, the implements being shown in an offset configuration for field applications which are constructed in accordance with the present invention.
Figure 2:
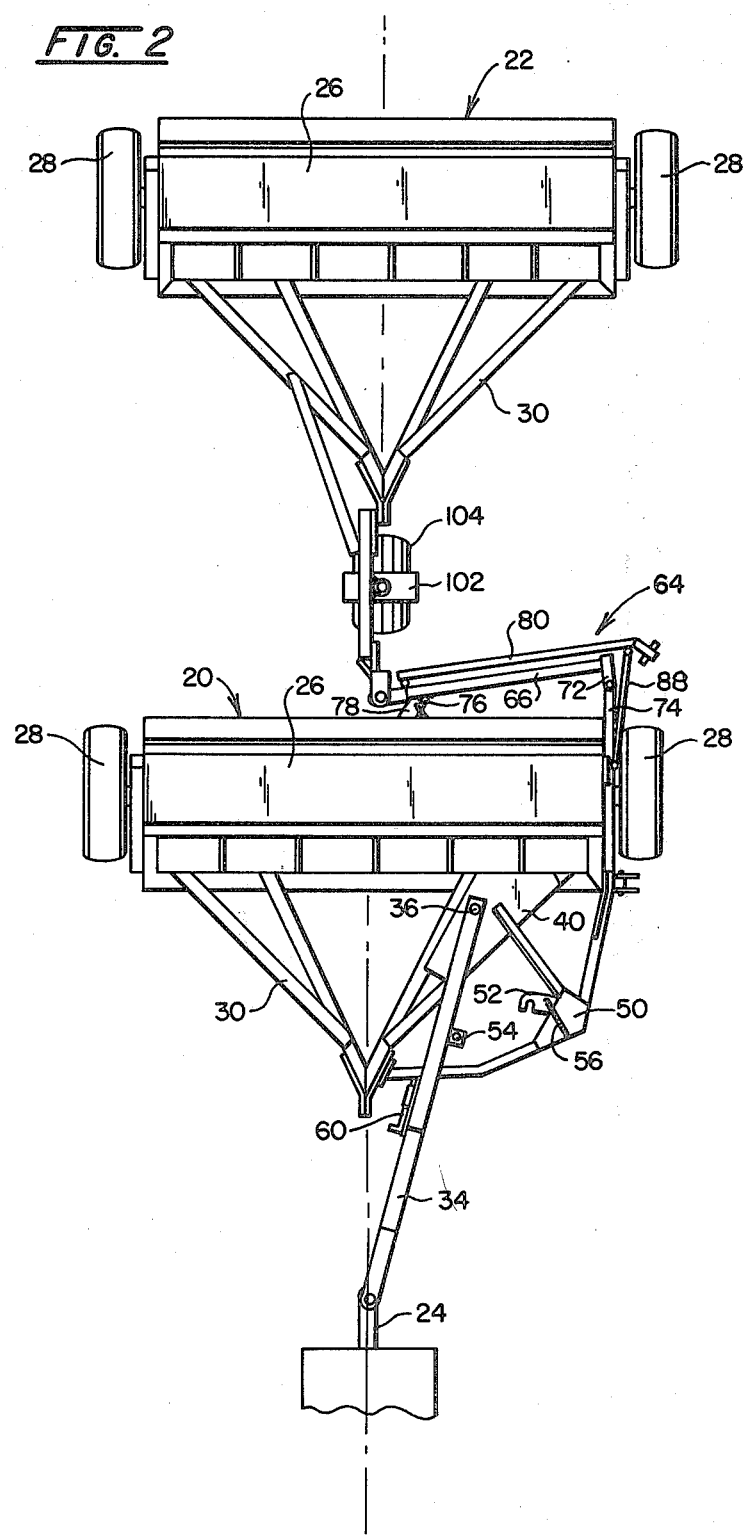
FIG. 2 is a top plan view of the apparatus shown in FIG. 1 with the drawn implements arranged in a single file relationship adapted for road transport of the implements to another field location.

Referring in detail to the drawings, a pair of farm implements, such as grain drills indicated generally at 20 and 22, are shown in FIGS. 1 and 2, and incorporate the multiple hitching and towing arrangement constructed in accordance with the present invention.

For purposes of description, the present invention is shown utilizing the standard frame of typical commercially available grain drills which have been adapted by adding structure in accordance with the present invention since many of such implements could be easily adapted in an economical manner. However, it should be readily apparent that newly manufactured implements could and would incorporate the features of the present invention with only minor changes in manufacture and include the construction of the present invention.

Grain drills 20 and 22 are shown in an offset relationship for field use towed behind a conventional farm tractor or the like, not shown in detail except for the rear portion provided with a conventional hitch member 24. FIG. 2 shows the grain drills 20 and 22 aligned in a single file relationship for road transport to other field use locations.

Both drills 20 and 22 include a conventional main body portion 26, a pair of spaced wheels 28, and a forwardly extending frame 30 from which a typical trailer tongue and a female hitch member may be attached. Further detailed description is believed unnecessary since such implements are conventional and well-known and further since other farm implements having similar overall frame constructions for other specific farm purposes could be adapted for use with the present invention.

The first or most forwardly positioned implement 20 is provided with an additional frame portion, indicated generally at 32 which carries a tongue 34 pivotally connected at its rearward end at 36. Tongue 34 also includes a conventional female hitch member which may be rotatably and releasably mounted at its forward end to conventional tractor hitch 24.

The added frame portion 32 includes a support plate 40 welded or otherwise fixed to implement frame 30 which carries a pivot pin 36 extended through the rear portion of tongue 34. This rear portion comprises an upper and lower brace member 44 fixed to the forward portion of tongue 34 to create a slot or opening through which a horizontally extending frame portion 46 extends to define a curved path. This frame portion 46 provides a guide rail and support upon which the tongue 34 may be pivoted to one of its desired positions.

The frame portion or guide rail 46 is fixed to the forward portion of frame 30 in a conventional manner and to the main body portion 26 along a right forward side portion, as viewed in FIG. 1, by means of bolted plates 47 which are welded to the frame 26.

A pair of support plate 50 are connected to guide rail 46 for added strength and to provide support for a spring biased latch means 52. Latch means 52 is a conventional hook-shaped member which is adapted to receive a cylindrical male latch member 54 which is mounted on the rear of tongue 34 between upper and lower brace members 44. As male latch member 54 engages the curved outer hook portion of latch 52, it will tend to force the latch 52 open against the bias of spring 56 to permit the cylinder latch member 54 to move into the opening of the hook shaped member. Once it is so received it is locked in this position until latch member 52, which is pivoted to plate 50 by pin 58, is pulled open to permit latch member 54 to slide free.

Tongue 34 is locked in its other position as shown in FIG. 2, by means of a conventional spring biased bolt member 60 which is adapted to be received by a slot or opening provided at a predetermined position on guide rail 46. Simply pulling outward on bolt member 60, releases tongue 34 to permit it to slide along guide rail 46 until it reaches latch means 52.

In view of the foregoing description, it should be understood that tongue 34 is pivotally mounted to automatically latch into one of two positions depending upon the manipulation of the towing vehicle and the desired position of the trailing vehicle 22 which is dictated by the swinging and foldable frame indicated generally at 64 which will not be described in detail.

A swinging, foldable frame unit, indicated generally at 64, is provided on first drill 20 on the right side portion as viewed in FIG. 1.

This unit 64 comprises a swinging tow bar or arm 66 which carries at its outer end a conventional hitch member 68. Hitch member 68 conventionally receives in a rotatable manner the cooperating hitch member 70 carried by a stub tongue 71 provided on trailing drill 22. Typically such hitch members for farm equipment are of the C-shaped female member receiving a male member and pivotally connected by a removably mounted pin or bolt.

Figure 3:
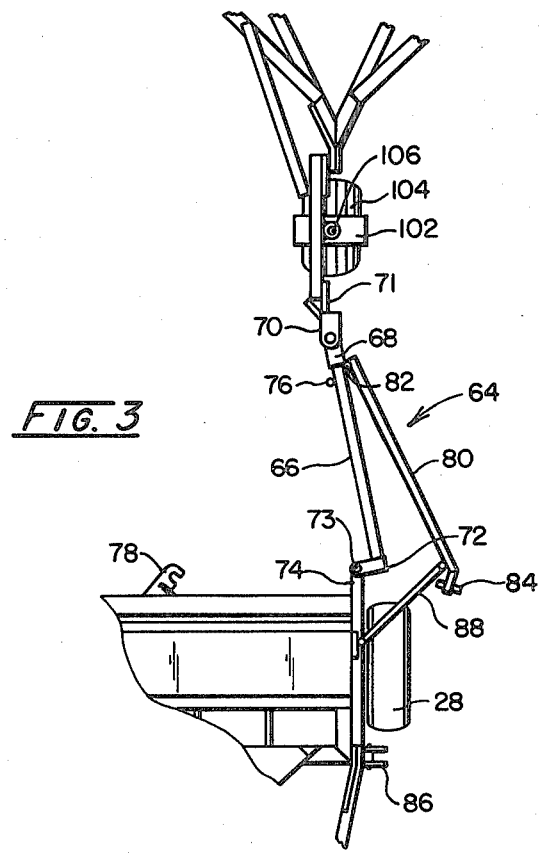
FIG. 3 is a partial top plan view of a portion of the apparatus shown in FIG. 1 and illustrating the swinging tow bar and associated linkage in an intermediate position between assuming either the offset or single file configuration.

With continued references to FIGS. 1-3, tow bar 66 includes a short arm 72 pivotally mounted via pin 73 to the rear portion of a side support frame member 74 fixed to main body 26. The other end of arm 72 is fixed to the end of the tow bar 66 to provide an offset relationship with respect to the point of pivotal movement, pin 73. Arm 72 is preferably a channel-like member which swings about the pin 73 and overlaps a portion of frame member 74 when bar 66 is in the fixed position shown in FIG. 1. This provides added support and strength and reduces the stress on the other members of frame 64.

Tow bar 66 also carries a cylindrical latch member 76 which is essentially identical to latch member 54. Latch member 76 is positioned to engage a latch means 78 in the identical manner as previously described for latch means 52 when the swing frame unit 64 and rear drill 22 moves to the position shown in FIG. 2.

Unit 64 also includes a folding linkage member 80 which is pivotally mounted at one end to tow bar 66 such as at 82. At its opposing end it carries a male latch member 84, identical in construction to the previously described latch members except it is horizontally disposed, and adapted to be received in a latch means 86 mounted to the frame portion 46.

A second linkage member 88 is provided at a raised level compared to member 80 and is pivotally connected to the main body 26 via a hinge type received 90 having flanged wings fixed to main body 26. A pin 91 is mounted within hinge portion 90 and another hinge portion 92 which is fixed in position via a support member 94 fixed to hinge portion 92 and member 88.

The outer end of linkage member 88 is pivotally connected to a vertical member 96 which is turn is pivotally connected at its lower end to member 80.

The second or trailing apparatus 22 includes a conventional tongue portion 100 which is adapted by the addition of a stub tongue portion 71 which is also provided with a support frame 102 mounted to frame 30 provided on drill 22. Support frame 102 carries a castor type wheel 104 pivotally mounted on a shaft 106. In this manner, trailing apparatus 22 follows the proper desired path whenever the frame unit 64 is in one of its fixed or latched positions.

Figure 6:
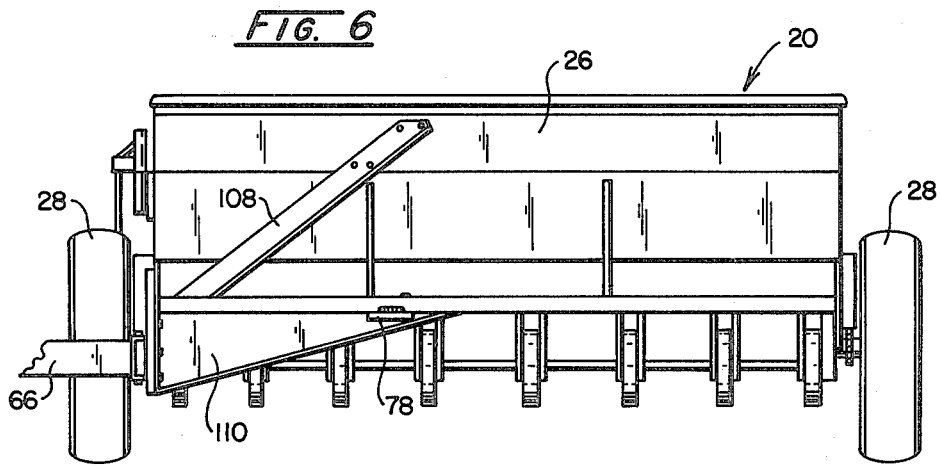
FIG. 6 is a partial rear elevational view of the forward implement shown in FIG. 1, illustrating a portion of the frame adaption of a standard farm implement employed in accordance with the present invention.
Figure 4:
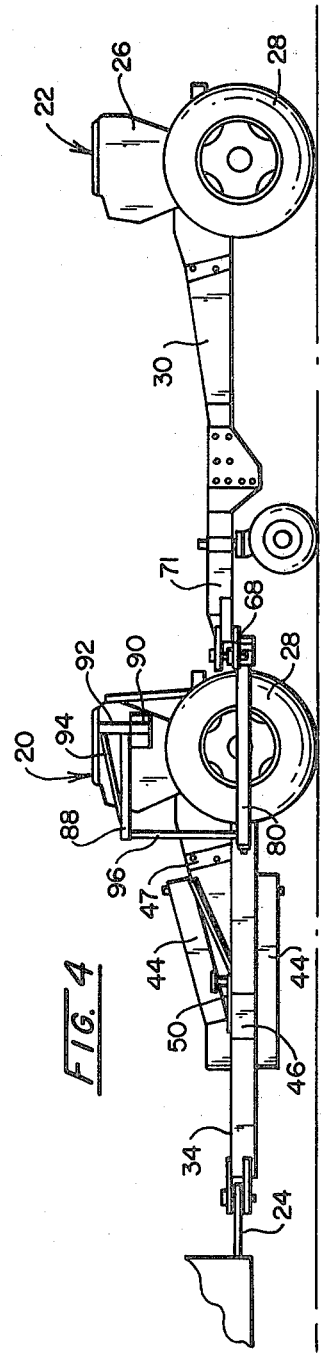
FIG. 4 is a side elevational view of the apparatus shown in FIG. 1.
Figure 5:
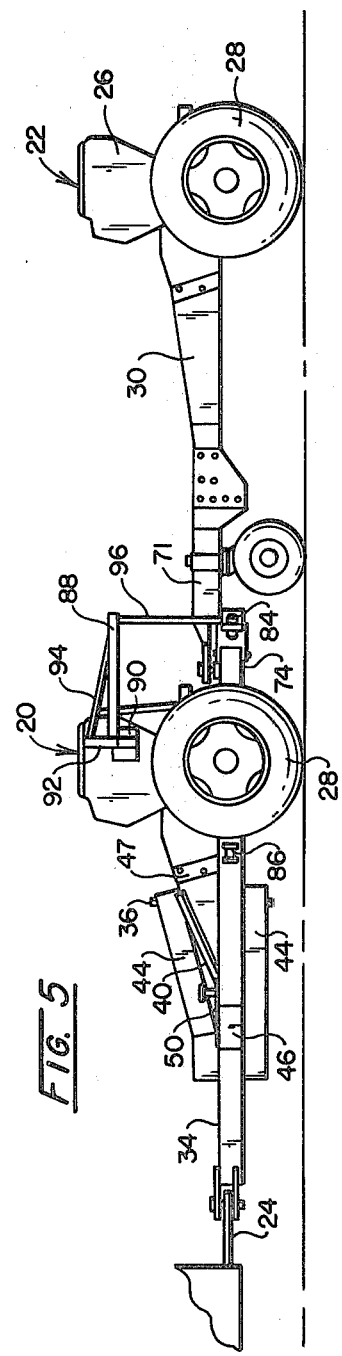
FIG. 5 is a side elevational view of the apparatus shown in the configuration illustrated in FIG. 2.

Referring specifically to FIG. 6, it was found useful to modify certain conventional frames of a grain drill by adding a pair of reinforcing plates to the rear thereof such as at 108 and 110 to merely provide a margin of increased strength to the original frame portions which are subject to stress particuarly when the grain drills are disposed in the field position shown in FIG. 1. However, on other models of grain drills including the most recent types, this is not always necessary to obtain the most efficient functioning of the invention.

In operation, the user conventionally connects tongue 34 to the hitch of a tractor or the like and the stub tongue 71 to hitch 68 carried by tow bar 66. The towing tractor is then manuevered to align the grain drills in the desired position.

Depending upon the configuration desired, the user manually releases the latch means 52 or 60 to free tongue 34 to slide to one of the opposite positions along guide rail 46 where it would becme automatically latched.

The latch means 86 or 78 are similarly released to free unit 64 to swing to the one of its positions depending upon the choice of the user.

Upon backing of the towing vehicle, assuming the desired configuration is that shown in FIG. 1 for field use, tongue 34 will assume the latched position shown therein. Then upon pulling forward, assuming rear drill 22 is unlatched but in the single file position shown in FIG. 2, the swinging bar 66 and associated linkage will begin to swing outwardly such as shown in the intermediate position of FIG. 3. Further backing and turning manuevers of the towing vehicle and the latched front drill 20 cause continued swinging of unit 64 to a position wherein latch means 84 engages means 86 to lock the drill 22 in the position shown in FIG. 1.

In this position, the drills 20 and 22 are in the desired configuration for efficient field use. Further, it is important to point out that the latch 24 connected to the forward end of tongue 34 is aligned equidistant between the outermost opposing wheels of drills 20 and 22 to assure an equal pulling force on each drill to minimize side draft forces.

Also it should be noted that the trailing drill will follow a true parallel course during turns to cover the most ground as efficiently as possible.

To change the configuration from that described and shown in FIG. 1 to that of FIG. 2, a similar procedure but reverse of that described previously is followed.

By merely releasing the latch means 86 and 52 and manuevering the towing vehicle, the drills will automatically assume the single file configuration of FIG. 2 in a latched position.

Of course, in view of the width of such drills, the single file position is necessary for convenient travel over conventional roadways, through farm gates of typical width and the like.

Also it is possible, if desired, to duplicate swinging and folding frame unit 64 on the second drill 22 and add a third drill. If this is done, the only modification necessary would be to lengthen tongue 34 to assure the hitch 24 of the towing vehicle is aligned equidistant between the outmost wheels of the first and third towed drills. In that instance, it wold be disposed approximately in the center of the second or middle drill.

A further important feature included in the present invention is shown in FIGS. 7 and 9. Link 80 and tow bar 66 are mounted to permit vertical pivotal movement of folding frame unit 64 when the drills are disposed in the wide field use configuration. Arm 66 is pivotally mounted to a pair of ears 112 via pin 114. The cylindrical latch member 84 is horizontally disposed in latch means 86 and is free to permit vertical pivoting of link member 80 within latch means 86. Therefore frame unit 64 automatically compensates for any typical deviation in contour encountered by trailing drill 22 different than that encountered by drill 20.

Common field use are bumps, depressions and the like which are in the path of one of the towed drills but not in the parallel path of the other.

The tremendous advantage of the construction of the present invention, in addition to fhe efficient wide configuration, minimizing side draft, and the like, is the ease and convenience of aligning the drills in either of the desired configurations. No special tools are required and in literally a minute or less the user is ready to continue his work or transfer the apparatus over the road to another field.

Compared to a half hour or the like required by other constructions adapted to draw tandem vehicles in more than one configuration or which require detachment and pulling one implement at a time to the next field location, the present invention represents a drammatic improvement in saving labor and time.

In view of the relatively low cost required to add the structure of the present invention to conventional grain drills or to modify future design of newly manufactured apparatus, it represents a truly significant advance over the prior art.

From the foregoing description, it should be apparent that the present invention provides a very significant saving in valuable time during the busy plating or harvesting season, with an economical and efficient structure which can increase productively and reduce fuel requirements to accomplish more productive work at less cost.

What is claimed is:

1. A multi-hitch arrangement for connecting a plurality of wheeled farm implements in a plurality of predetermined positions behind a towing vehicle comprising, in combination, a first wheeled farm implement provided with a first towing means adapted for connection to said towing vehicle and a second towing means adapted for connection to a second wheeled farm implement provided with a tongue portion; said first towing means including a forwardly extending tongue portion pivotally mounted at its rearward end to a frame portion of said first farm implement and having a hitching means on its front portion pivotally connected to a hitch member on said towing vehicle, said forwardly extending tongue portion being movable between at least a first and second releasably locked towing position; said second towing means mounted to a rear portion of said first implement and including a tow bar pivotally connected at one end to a support frame means mounted on said first implement and provided with a hitching means connected at its opposite end to the tongue portion provided on said second farm implement, said tow bar and said support frame means being pivotally movable between a first and second releasably locked towing position responsive to the towing position of said tongue portion of said first towing means; said first towing position defining a single file relationship between the towed farm implements and said second towing position defining an offset relationship between said towed farm implements, the position of said hitch connection between said tongue portion of said first towing means and said towing vehicle being disposed substantially equidistant between the opposing outermost wheel of said first and second farm implement in either said first or second towing position to provide a substantially equal draft force upon said towed farm implements.

2. The apparatus defined in claim 1 wherein said first towing means includes a frame means mounted on said first farm implement provided with a rail portion of said forwardly extending tongue portion includes upper and lower brace members defining an opening slideably receiving said rail portion, and latch members disposed on said rail portion and cooperating with latch members on said tongue portion to releasably lock said tongue portion in either said first or second towing position.

3. The apparatus defined in claim 1 wherein said support frame associated with said second towing means includes a linkage arrangement operatively connected between said tow bar and said first farm implement to transfer the motion of said first farm implement to said tow bar when said tow bar is connected to said second farm implement and is not locked in one of said towing positions to effect the pivoting of said tow bar from one towing position to another dependent upon the position of said tongue portion of said first towing means.

4. A multiple hitching apparatus for tractor drawn farm implements adapted to draw a plurality of said implements in a first position defined as a single file relationship or in a second position defined as an offset relationship with respect to a the implements being towed comprising, in combination, a forwardly extending tongue portion pivotally mounted at its rearward end to a frame portion of first farm implement and including a conventional hitch member at its forward end; means for releasably locking said tongue portion in either of at least two towing positions, each of said positions relating to the desired position of a second and trailing farm implement; a pivotally mounted tow bar mounted toward the rear and side frame portions of said first implement for pivotal movement between an inwardly and outwardly extended position and carrying a conventional hitch member adapted to be connected to a conventional hitch member provided on the forward end of said second trailing farm implement; a support frame connected to said tow bar and pivotally connected to said frame of said first implement and including a linkage member pivotally mounted at one end to said tow bar and having a latch member disposed at its opposing end, said linkage member being movable between a first position substantially parallel to said tow bar when said tow bar is disposed in said inwardly extended position and a second position defining approximately a forty-five degree angle with said tow bar; means mounted on said first implement means for releasably locking said tow bar and said associated support frame in either of said inwardly or outwardly extended positions dependent upon the towing position of said forwardly extending tongue portion mounted on said first farm implement.

5. In a multiple hitch arrangement to draw at least to farm implements in either a first, single file towed position or a second, offset towed position with respect to one another, the combination of, a first tongue portion pivotally connected at its rearward end to a frame means mounted on a first forwardly most disposed farm implement and having a forwardly extending front end provided with a hitching means for pivotal and releasable connection to a towing vehicle, said first tongue portion being movably mounted on said support frame between releasably fixed first and second towing positions; a tow bar pivotally connected at one end to a support frame mounted on a rearward portion of said first farm implement and provided with a hitching member at its opposite end for pivotal and releasable connection to a second towed farm implement, said support frame including linkage members operatively connected to said first farm implement and said tow bar and movable in cooperation with said tow bar between first and second releasably locked towing position responsive to the towing position of said first tongue portion, whereby the connection between said hitching means of said first tongue portion and said towing vehicle is disposed to provide a substantially equal pulling force on each of said towed farm implements in either of said first or second towed positions.

6. The hitch arrangement defined in claim 5 wherein said tow bar and said support frame are mounted for pivotal movement about a horizontal axis responsive to at least a limited vertical movement of said second farm implement when it is disposed in said second, offset portion.

* * * * *